United States Patent [19]

Simoens

[11] Patent Number: 5,403,667

[45] Date of Patent: Apr. 4, 1995

[54] COMPATIBILIZED COMPOSITIONS COMPRISING A POLYAMIDE AND POLYPROPYLENE AND ADHESIVE COMPOSITES CONTAINING THESE COMPOSITIONS

[75] Inventor: Anthony Simoens, Vedrin, Belgium

[73] Assignee: Solvay & Cie (Société Anonyme), Brussels, Belgium

[21] Appl. No.: 258,833

[22] Filed: Jun. 13, 1994

Related U.S. Application Data

[62] Division of Ser. No. 898,092, Jun. 12, 1992, Pat. No. 5,346,773, which is a division of Ser. No. 458,387, Dec. 28, 1989, Pat. No. 5,140,059.

[30] Foreign Application Priority Data

Jan. 12, 1989 [FR] France .................. 89 00424

[51] Int. Cl.⁶ .................. B32B 23/08; B32B 27/10; B32B 27/34
[52] U.S. Cl. .................. 428/479.6; 428/479.3
[58] Field of Search .................. 428/479.3, 479.6

[56] References Cited

U.S. PATENT DOCUMENTS

| | | | |
|---|---|---|---|
| 3,804,919 | 4/1974 | Schrage et al. | 525/70 |
| 4,233,367 | 11/1980 | Ticknor et al. | 428/476.3 |
| 4,404,312 | 9/1993 | Kokubu et al. | 524/504 |
| 4,416,942 | 11/1983 | DiLuccio | 428/332 |
| 4,762,737 | 8/1988 | Lu | 428/35 |
| 5,071,338 | 8/1991 | Suehiro et al. | 428/516 |

FOREIGN PATENT DOCUMENTS

| | | |
|---|---|---|
| 2365618 | 4/1978 | France . |
| 2504143 | 10/1982 | France . |
| 1345747 | 2/1974 | United Kingdom . |
| 1563030 | 3/1980 | United Kingdom . |
| 2099435 | 12/1982 | United Kingdom . |
| 2156364 | 10/1985 | United Kingdom . |

OTHER PUBLICATIONS

Chemical Abstracts, vo. 81, 1974, p. 11, Résumé No. 4410d, Columbus, Ohio, U.S. F. Ide et al. "Properties of Polypropylene-Nylon Blend Polymer Filled With Glass Fibers".

Primary Examiner—Ana L. Carrillo
Attorney, Agent, or Firm—Spencer, Frank & Schneider

[57] ABSTRACT

An adhesive composite including a layer consisting of a compatibilized composition including at least one polyamide, and at least one propylene polymer which is at least partially modified by a polar monomer and which has a melt flow index (MFI) measured according to ASTM standard D 1238-86 (230/2.16 conditions) higher than 20 g/10 min., preferably, higher than 50 g/10 min., most preferably such that 70 g/10 min.≦MFI of the propylene polymer ≦80 g/10 min.; and a layer consisting of at least one other material which is comprised of at least one cellulosic product and which is bonded to the layer consisting of a compatibilized composition.

15 Claims, No Drawings

COMPATIBILIZED COMPOSITIONS COMPRISING A POLYAMIDE AND POLYPROPYLENE AND ADHESIVE COMPOSITES CONTAINING THESE COMPOSITIONS

This is a division of application Ser. No. 07/898,092, filed Jun. 12, 1992, now U.S. Pat. No. 5,346,773, which is a division application Ser. No. 07/458,387, filed Dec. 28, 1989, now U.S. Pat. No. 5,140,059.

BACKGROUND OF THE INVENTION

1. Field of the Invention

The present invention relates to compatibilized compositions comprising a polyamide and polypropylene. It relates more particularly to compositions exhibiting an improved combination of mechanical and adhesive properties and comprising a semiaromatic polyamide and polypropylene of which at least a part is modified by grafting with a polar monomer, and optionally a fibrous reinforcing agent.

The invention also relates to adhesive composites of these compositions with other materials, generally chosen from organic synthetic polymers, cellulosic products and metals, and to shaped objects made from these composites.

2. Description of the Related Art

Compositions based on polypropylene (called PP hereinafter) of which a part is modified by an unsaturated carboxylic acid or an anhydride of such an acid and also containing a polyamide (called PA hereinafter) and glass fibres as a reinforcing material have been described in patents U.S. Pat. No. 4,404,312 (Toyo Boseki K.K.) and GB-A-1,345,747 (Mitsubishi Rayon Co.). These compositions exhibit advantageous mechanical properties such as high rigidity and impact strength.

Compositions exhibiting a synergy in certain physical properties, such as adhesiveness, are also known (patent U.S. Pat. No. 3,804,919 in the name of Dart Industries, Inc.). These compositions are, for example, mixtures of unmodified PP and of PP modified by reaction with glycidyl acrylate in the presence of an organic peroxide. The PPs are reinforced using glass fibres (examples).

However, it has not been possible, until now, to unite a satisfactory combination of mechanical properties and of adhesiveness properties in the same single composition.

SUMMARY OF THE INVENTION

This invention is aimed at overcoming this disadvantage and consequently at providing compositions based on polyamide and on polypropylene exhibiting mechanical properties and adhesiveness properties at the same time and to a sufficient degree.

To this end, the present invention relates to compatibilized compositions comprising at least one polyamide (PA) and at least one propylene polymer (PP) which is at least partially modified by a polar monomer, in which compositions the propylene polymer has a melt flow index (MFI) (flow rate) measured according to ASTM standard D 1238-86 (230/2.16 conditions) higher than 20 g/10 min.

The polyamides PA contained in the compatibilized compositions according to the invention may be chosen from the PAs derived, on the one hand, from aliphatic, alicyclic and aromatic amines and, on the other hand, from aliphatic, alicyclic and aromatic dicarboxylic acids.

Examples of amines which can be employed are hexamethylenediamine, decamethylenediamine, dodecamethylenediamine, 2,2,4- and 2,4,4-trimethylhexamethylenediamines, 1,3- and 1,4-bis(aminomethyl)cyclohexanes, bis(p-aminocyclohexylmethane), m-xylylenediamine and p-xylylenediamine.

Examples of acids which can be employed are adipic, suberic, sebacic, glutaric, azelaic, cyclohexanedicarboxylic, isophthalic and terephthalic acids.

The PAs involved may also be derived from acyl halides or alkyl diesters of these acids, from aminocarboxylic acids such as 6-aminocaproic, 6-aminocaprylic, 6-aminolauric, 11-aminoundecanoic and 12-aminododecanoic acids, for example, or else from lactams derived from these acids, such as, for example, $\epsilon$-caprolactam and $\omega$-dodecalactam.

These PAs can be derived from more than one amine or from more than one acid; mixtures of different PAs can also be employed.

Examples of individual PAs which can be employed are polyhexamethylene adipamide (nylon 66), polyhexamethylene sebacamide (nylon 610), polycapramide (nylon 6) and polydodecanamide (nylon 12).

Nevertheless, bearing in mind their good rigidity and their low moisture absorption, the preferred PAs are the PAs obtained by polycondensation of xylylenediamines with $\alpha,\omega$-dicarboxylic linear aliphatic acids containing from 6 to 12 carbon atoms and most particularly the PAs obtained by a condensation reaction of m-xylylenediamine with adipic acid (called PAMXD6 hereinafter). Among these the PAMXD6s of medium molecular weight such that their relative viscosity (measured in the form of a solution containing 10 g/l at 25° C. in 96% by weight sulphuric acid) does not exceed 4 are preferred. The compromise of mechanical and adhesiveness properties of the compatibilized compositions is quite remarkable when they contain PAMXD6 with a relative viscosity of between 1 and 3.

The propylene polymers PP contained in the compositions of the invention may be any polymers containing at least 50% and, preferably, at least 80% of propylene-derived monomer units in their molecule. By way of examples there may be mentioned: propylene homopolymers, random copolymers of propylene and of at least one other alpha-olefin, such as ethylene or butene, containing at least 80 mol % of propylene, and so-called "block" copolymers comprising chain segments of variable lengths, each of which consists of a propylene homopolymer or of a random copolymer such as described above.

At least a part of the PP forming part of the compositions according to the invention is modified by a polar monomer. The compositions according to the invention can therefore contain unmodified PP and modified PP. In general, at least 50% by weight of the PP present in the compositions according to the invention is modified by a polar monomer and, preferably, at least 80% by weight, to ensure an optimum compatibility with the PA also present in the compositions. For convenience reasons and because it is an easy means of obtaining PPs which have the high melt flow indices characteristic of the invention, it is further preferred that all the PP present in the compositions be modified.

PP modified by means of polar monomers is intended to refer to PPs comprising units derived from polar monomers, in addition to the monomer units defined above.

The polar monomers used to modify the PP may be any organic compounds containing at least one unsaturated bond, preferably of olefinic type, and at least one carboxylic group, optionally in anhydride form.

Monomers containing from 3 to 12 carbon atoms in their molecule are preferably employed. These polar monomers may be especially unsaturated monocarboxylic acids such as acrylic, methacrylic or chloroacrylic acids, or unsaturated polycarboxylic acids such as maleic, fumaric and itaconic acids, or else anhydrides derived from these acids, such as maleic anhydride. The preferred polar monomers are acrylic and methacrylic acids and maleic anhydride. The best results are obtained with maleic anhydride.

The quantity of polar monomers modifying the PP is generally between 0.002 and 20% by weight of PP employed. It is usually preferred that this quantity be between 0.01 and 10%, the best results being obtained between 0.05 and 5%.

Where the structure of this modified PP is concerned, preference is given to graft copolymers in which the main chain (or backbone) is polyolefinic (polypropylenic) in structure, and the side chains (or grafts) are derived from polar monomers.

These graft copolymers may be manufactured by any known grafting techniques such as grafting in solution, by irradiation or in the presence of initiators, and grafting by melt-compounding, the latter being preferred. The grafting reaction is advantageously performed in the presence of free radicals which can be generated by any of the known techniques for this purpose, such as irradiation or ozonization. The operation is usually performed at elevated temperature (for example between 180° and 270° C.) and, preferably, in the presence of compounds releasing free radicals under the action of heat. Most particularly, it is preferred to work in the presence of organic peroxide compounds which have a decomposition temperature higher than 130° C. Examples of peroxide compounds which can be employed are 2,5-dimethyl-2,5-di(tert-butylperoxy)hexane, 2,5-dimethyl-2,5-di(tert-butylperoxy)hexyne, di-tert-butyl peroxide, tert-butyl hydroperoxide, alpha,alpha'-di(tert-butylperoxy)diisopropylbenzene and dicumyl peroxide. The abovementioned peroxides are generally employed in a proportion of 0.01 g to 20 g per kg of PP used. Quantities of between 0.05 and 10 g/kg and preferably of those between 0.1 and 5 g/kg are usually employed.

The weight ratio of the PAs to the PPs in the compositions according to the invention is generally between 95/5 and 55/45, preferably between 90/10 and 60/40. PA/PP ratios which are particularly preferred are those between 75/25 and 65/35.

The MFI of the PP contained in the compositions according to the invention constitutes an essential characteristic thereof. The expression "MFI of the PP" is intended to denote the melt flow index measured (ASTM standard D 1238-86; 230/2.16 conditions) on all the PPs to be incorporated in the compositions. This implies that if several different PPs are incorporated, for example a modified portion and an unmodified portion, an MFI measurement is performed on each of the PPs to be incorporated; the "MFI of the PP" will then be the weighted mean of the various measured MFIs. It is appropriate to emphasize, nevertheless, that for convenience reasons it is preferred that the MFIs of the PPs to be incorporated into the compositions do not differ from each other by more than ten units.

This MFI must be higher than 20 g/10 min, it is preferably higher than 50 g/10 min. The upper value of the MFI is limited only by the practical possibility of its being incorporated properly into the compositions according to the invention. This value can be determined for each individual composition by a person skilled in the art, without excessive experimentation.

The best compromise of mechanical properties and of adhesiveness properties is obtained when the MFI of the PP is such that 50 g/10 min < MFI of the PP < 100 g/10 min, most particularly when this MFI is such that 70 g/10 min ≦ MFI of the PP ≦ 80 g/10 min.

The compatibilized compositions according to the invention may also contain one or more supplementary ingredients among those described below.

They may contain a fibrous reinforcing agent such as, for example, glass fibres, carbon fibres, metal carbide or boride fibres, whiskers, etc. A preferred fibrous reinforcing agent consists of glass fibres, optionally treated with conventional coupling agents. Silanes may be mentioned as such agents.

When a fibrous reinforcing agent is incorporated into the compositions according to the invention, it may constitute from 10 to 80% of the total weight of these compositions, and preferably from 20 to 70% by weight. The best results are recorded when the fibrous reinforcing agent constitutes from 35 to 65% of the total weight of the compositions.

Besides the PA, the at least partially modified PP and the optionally fibrous reinforcing agent, the compositions according to the invention may also contain conventional additives chosen from those listed below, no limitation being implied:

inorganic fillers,
flame retardants,
antistatic agents,
colorants,
pigments,
mould release agents,
and the like.

The compositions may also contain conventional nucleating agents for the PA constituent, such as talc or alkali and alkaline-earth metal phosphinates; when the PA contained in the compositions is PAMXD6, a well-known nucleating agent is polyhexamethylene adipamide (nylon 66).

Finally, the compositions may contain stabilizers (against heat, light, antioxidants, etc.) which are conventional in PP and in PA.

The compatibilized compositions of the invention may be prepared by any of the known techniques ensuring an intimate mixing of their constituents. Thus, the PA, the PP, the optional fibrous reinforcing agent and the optional other additives may be mixed dry and then melt-compounded. To carry out the dry mixing, it is possible to employ any mixer, such as ribbon blenders, drum mixers or the rapid mixers marketed by Henschel, Loedige, Dyosna and other companies. To carry out the melt-compounding, the work can be done equally well in mixers of the external type or in mixers of the internal type, such as those marketed by Troester, Banbury and other companies. For technical and economical reasons it is preferred, however, to work in mixers of the internal type and more particularly in extruders, which constitute a particular class of internal mixers. These extruders may be single-screw extruders or twinscrew extruders. The melt-compounding is generally carried out between 200° and 320° C., preferably between 240° and 280° C., for periods of between 5 seconds and 30 minutes, preferably between 30 seconds and 15 minutes.

In an alternative form of the process described above, the optional fibrous reinforcing agent may be added, for example, to the previously compounded and molten mixture of PA and of PP and the melt-compounding may be continued in the presence of the reinforcing agent.

The compatibilized compositions of the invention may be processed generally in powder form or in the form of granules according to any of the known conventional methods: by injection moulding, by extrusion, by pressing, and the like.

According to another of its aspects, the invention also relates to adhesive composites of the compatibilized compositions described above with other materials capable of resulting in coherent and mechanically strong composites with these compositions. These other materials are generally chosen from organic synthetic polymers, cellulosic products, such as paper, cardboard and the like, and metals.

These other materials are preferably chosen from organic synthetic polymers, particularly polymers which can be shaped using the techniques for processing thermoplastic polymers. These polymers may optionally contain any of the other conventional additives already listed in relation to the compatibilized compositions.

These organic synthetic polymers may be conventional thermoplastic polymers such as vinyl chloride polymers and copolymers, styrene polymers and copolymers and polymers and copolymers of alpha-monoolefins such as ethylene and propylene.

These organic synthetic polymers may also be chosen from the polymers called "thermoplastic elastomers", that is to say polymeric materials of heterophase type consisting of a rubbery matrix in which there are rigid regions.

At ambient temperature these rigid regions replace the vulcanization bridges which provide the elastic properties in conventional elastomers, and at elevated temperature (that is to say above the melting temperature of the crystalline phase) their disappearance permits a normal thermoplastic rheology, consequently enabling these materials processed according to the traditional techniques applicable to thermoplastic polymers (extrusion, injection and the like), which are much simpler and faster than techniques using vulcanization.

The thermoplastic elastomers which can be employed for producing the composites may be chosen from

- block copolymers containing rigid polyurethane blocks and flexible blocks made up of polyether chains or of polyesters ending in hydroxyl groups; the products Desmopan from Bayer and Estane from Goodrich may be mentioned as examples of these copolymers;
- styrene copolymers containing rigid polystyrene in blocks interrupted by flexible polybutadiene, polyisoprene or ethylene-propylene elastomer blocks; the products Kraton and Cariflex from Shell and the products Solprene from Phillips Petroleum may be mentioned as examples of these copolymers;
- block copolymers containing rigid aromatic polyester blocks and flexible blocks consisting of polyethers ending in alcohol functional groups; Du Pont's Hytrel products may be mentioned as examples of these copolymers;
- olefinic thermoplastic elastomers (called OTE hereinafter), which are mechanical mixtures of crystalline polyolefins such as polyethylene and polypropylene and of olefinic elastomers such as elastomeric co- and terpolymers of ethylene, propylene and an optional diene like 1,4-hexadiene, these elastomers being optionally partially crosslinked; by way of examples of these OTEs there may be mentioned the products TPR from Uniroyal, Telcar from Goodrich, Nordel TP from Du Pont, Dutral TP from Montedison and Santoprene from Monsanto; and
- ionomeric elastomers such as, for example, the sulphonated and neutralized unsaturated olefinic elastomers, called "thionic polymers" by Exxon.

Among all the synthetic organic polymers listed above it is preferred to produce the adhesive composites with those containing propylene-derived units, in particular with thermoplastic propylene homopolymers and copolymers and with OTEs containing approximately 25 to approximately 50% by weight of crystalline polypropylene, the latter making it possible to obtain adhesive composites with remarkable properties with great ease.

The adhesive composites of the invention may contain the compatibilized compositions described above and the other materials in any proportions. In general, the compatibilized compositions and the other materials are present in the adhesive composites of the invention in proportions by weight of between 5/95 and 95/5, preferably between 20/80 and 80/20.

To produce the adhesive composites of the invention, the compatibilized compositions and the other materials can be bonded by any conventional method. In particular, these compositions and these other materials may be bonded by pressing, by coinjection, by overinjection of one onto the other, by coextrusion, and the like. Using the same methods, these adhesive composites may be shaped into objects such as injected articles, extruded articles, profiles, seals with elastomeric properties, products with "barrier" properties (by virtue of the presence of the PA), composite materials, and the like.

DESCRIPTION OF THE PREFERRED EMBODIMENTS

The examples which follow are used to illustrate the invention.

EXAMPLE 1

A compatibilized composition is prepared by dry mixing with each other the following constituents in the proportions shown:

27.8 parts by weight of PAMXD6 with a relative viscosity (measured in the form of a solution containing 10 g/l at 25° C. in 96% by weight sulphuric acid) of 2.1

3.0 parts by weight of nylon 66, 0.6 parts by weight of talc, 0.1 parts by weight of barium stearate (lubricant), 55 parts by weight of glass fibres (GF) marketed by Owens Corning under the name CS R 17 BX 1, and 13.5 parts by weight of PP modified by grafting with 1% by weight of maleic anhydride and whose MFI is 70 g/10 min.

Test specimens are injection-moulded from the above compositions to determine their tensile strength according to ASTM standard D 638 and their resilience according to ASTM standard D 256. These determinations give the following results: tensile strength test:
  strength: 158.3 MPa
  modulus: 16.37 GPa
  resilience test: 79.1 J/m The compatibilized composition described above is injection-moulded in the form of a plaque (a). Separately, an olefinic thermoplastic elastomer marketed by Monsanto under the name Santoprene 121-73-S 108 is also converted into a plaque (b) pressed at 180° C. in a Lafarge press (30-tonne model) at a pressure of 4 MPa for 1 minute.

Plaque (a) (length: 125 mm, width: 125 mm, thickness 2 mm) and plaque (b) (length: 200 mm, width: 0 mm, thickness: 2 mm) are pressed in the same press at 220° C. at a pressure of 3 MPa for 1 minute.

The composite resulting from the combination of the plaques (a) and (b) is cut into test specimens 200 mm in length and 25 mm in width. The contact surface, therefore, represents a rectangle of 125×25 mm. The test specimens are kept at ambient temperature for 24 hours. An adhesiveness test is carried out according to BS (British Standard) 5350, part C 11 on these test specimens with a pull speed of 100 mm/min until failure by loss of adhesion of the parts in contact.

The results of this test are cited below (mean of 3 measurements):
  adhesive strength (N): 29.3
  adhesive strength per unit length (N/m): 1171

EXAMPLES 2, 3 and 4R (Examples 2 and 3 illustrate the invention; Example 4R is provided by way of comparison).

Compatibilized compositions are prepared by dry mixing with each other the same constituents as in Example 1, except that the PAMXD6 employed has a relative viscosity of 3.5.

In addition:
  in Example 2, the modified PP is the same as that employed in Example 1;
  in Example 3, the modified PP contains 1% of maleic anhydride and has an MFI of 25 g/10 min; and
  in Example 4R (for comparison), the modified PP contains 1% of maleic anhydride and has an MFI of g/10 min.

The Table below mentions the quantities of various constituents used to prepare the compatibilized compositions of these examples, the mechanical properties of these compositions, measured as shown in Example 1, and the results of the adhesiveness test, carried out as described in Example 1.

TABLE

| Examples | 2 | 3 | 4R |
|---|---|---|---|
| Nature and quantity (parts by weight) of the constituents used: | | | |
| PAMXD6 | 30.2 | 28.9 | 30.2 |
| Nylon 66 | 3.9 | 5.0 | 3.9 |
| Talc | 0.8 | 1.0 | 0.8 |
| Barium stearate | 0.1 | 0.1 | 0.1 |
| GF | 50 | 50 | 50 |
| Modified PP | 15 | 15 | 15 |
| MFI of the modified PP (g/10 min) | 70 | 25 | 9 |
| Mechanical properties: | | | |
| 1. Tensile strength | | | |
| strength (Mpa) | 158.5 | 148.4 | 113.5 |
| modulus (GPa) | 17.01 | 16.80 | 16.42 |
| 2. Resilience (J/m) | 101 | 80 | 75 |
| Adhesiveness test: | | | |
| Adhesive strength (N) | 19.9 | 12.7 | 5.5 |
| Adhesive strength per unit length (N/m) | 795 | 510 | 219 |

The results collated in this table show that, all other conditions remaining similar, the compatibilized compositions containing a PP of high MFI according to the invention exhibit a superior compromise of mechanical properties and of adhesiveness properties.

EXAMPLE 5R

This example is given by way of comparison.

A composition is prepared as described in Examples 2 to 4R, but without incorporating the modified PP.

A plaque injection-moulded from this composition, is pressed onto a plaque of the Santoprene product, as shown in Example 1, and the resulting composite is subjected to an adhesiveness test. The measured adhesive strength is nil.

What is claimed is:

1. An adhesive composite, comprising:
  a. a layer consisting of a compatibilized composition comprised of at least one polyamide, and at least one propylene polymer which is at least partially modified by a polar monomer and which has a melt flow index (MFI) measured according to ASTM standard D 1238-86 (230/2.16 conditions) such that 70 g/10 min.≦MFI of the propylene polymer≦80 g/10 min.; and
  b. a layer consisting of at least one other material which is comprised of at least one cellulosic product and which is bonded to the layer consisting of a compatibilized composition.

2. The adhesive composite according to claim 1, wherein the at least one other material is selected from the group consisting of paper and cardboard.

3. The adhesive composite according to claim 1, wherein the adhesive composite contains proportions by weight of the compatibilized composition and the at least one other material which range from 5 to 95 to 95 to 5.

4. The adhesive composite according to claim 1, wherein the adhesive composite contains proportions by weight of the compatibilized composition and the at least one other material which range from 20 to 80 to 80 to 20.

5. An object manufactured from an adhesive composite according to claim 1.

6. An adhesive composite, comprising:
  a. a layer consisting of a compatibilized composition comprised of at least one polyamide, and at least one propylene polymer which is at least partially modified by a polar monomer and which has a melt flow index (MFI) measured according to ASTM standard D 1238-86 (230/2.16 conditions) higher than 20 g/10 min.; and
  b. a layer consisting of at least one other material which is comprised of at least one cellulosic product and which is bonded to the layer consisting of a compatibilized composition.

7. The adhesive composite according to claim 6, wherein the at least one other material is selected from the group consisting of paper and cardboard.

8. The adhesive composite according to claim 6, wherein the adhesive composite contains proportions by weight of the compatibilized composition and the at least one other material which range from 5 to 95 to 95 to 5.

9. The adhesive composite according to claim 6, wherein the adhesive composite contains proportions by weight of the compatibilized composition and the at least one other material which range from 20 to 80 to 80 to 20.

10. An object manufactured from an adhesive composite according to claim 6.

11. An adhesive composite, comprising:
  a. a layer consisting of a compatibilized composition comprised of at least one polyamide, and at least one propylene polymer which is at least partially modified by a polar monomer and which has a melt flow index (MFI) measured according to ASTM standard D 1238-86 (230/2.16 conditions) higher than 50 g/10; and
  b. a layer consisting of at least one other material which is comprised of at least one cellulosic product and which is bonded to the layer consisting of a compatibilized composition.

12. The adhesive composite according to claim 11, wherein the at least one other material is selected from the group consisting of paper and cardboard.

13. The adhesive composite according to claim 11, wherein the adhesive composite contains proportions by weight of the compatibilized composition and the at least one other material which range from 5 to 95 to 95 to 5.

14. The adhesive composite according to claim 11, wherein the adhesive composite contains proportions by weight of the compatibilized composition and the at least one other material which range from 20 to 80 to 80 to 20.

15. An object manufactured from an adhesive composite according to claim 11.

* * * * *